United States Patent [19]

Ishii et al.

[11] 4,279,846
[45] Jul. 21, 1981

[54] PROCESS FOR PREPARING SEMIPERMEABLE MEMBRANE HAVING SELECTIVE PERMEABILITY

[75] Inventors: Kiyoshi Ishii; Zenjiro Honda; Hitoshi Tsugaya, all of Oimachi, Japan

[73] Assignee: Daicel Chemical Industries, Ltd., Osaka, Japan

[21] Appl. No.: 135,590

[22] Filed: Mar. 31, 1980

[30] Foreign Application Priority Data

Apr. 6, 1979 [JP] Japan .................................. 54/41654

[51] Int. Cl.³ ...................... B29D 27/00; B29H 7/20; B29D 7/02; B01D 13/00
[52] U.S. Cl. ................................... 264/41; 264/217; 427/358; 427/336; 427/389.9; 210/321.3; 210/500.2; 106/186; 106/187
[58] Field of Search ................. 106/186, 187; 210/22, 210/321 B, 500 M, 321.3, 500.2; 264/41, 49, 217; 427/384, 336, 358, 389.9

[56] References Cited

U.S. PATENT DOCUMENTS

| | | | |
|---|---|---|---|
| 3,822,330 | 7/1974 | Muir et al. | 264/41 |
| 4,026,978 | 5/1977 | Mungle et al. | 264/41 |
| 4,147,622 | 4/1979 | Nassbaumer | 264/41 X |

OTHER PUBLICATIONS

*First International Symposium on Water Desalination,* Manjikian et al., pp. 1–9, Oct., 1965.

*Primary Examiner*—Michael R. Lusignan
*Attorney, Agent, or Firm*—Blanchard, Flynn, Thiel, Boutell & Tanis

[57] ABSTRACT

A semipermeable membrane suitable for the use in an artificial kidney of the filtration type is produced by preparing a solution of cellulose acetate in a solvent mixture consisting essentially of a solvent for cellulose acetate and a swelling agent and spreading said solvent on a substrate, the solvent being a mixture of dimethylformamide and acetone, the swelling agent being a mixture of cyclohexanone and water, the ratio by weight of the amount of dimethylformamide and that of acetone to that of the swelling agent being within the area defined by four points consisting of A (60, 20, 20), B (35, 45, 20), C (25, 35, 40) and D (50, 10, 40) in the triangular coordinates represented by FIG. 1; the ratio of cyclohexanone to water being in a range of from 0.8 to 1.3.

2 Claims, 1 Drawing Figure

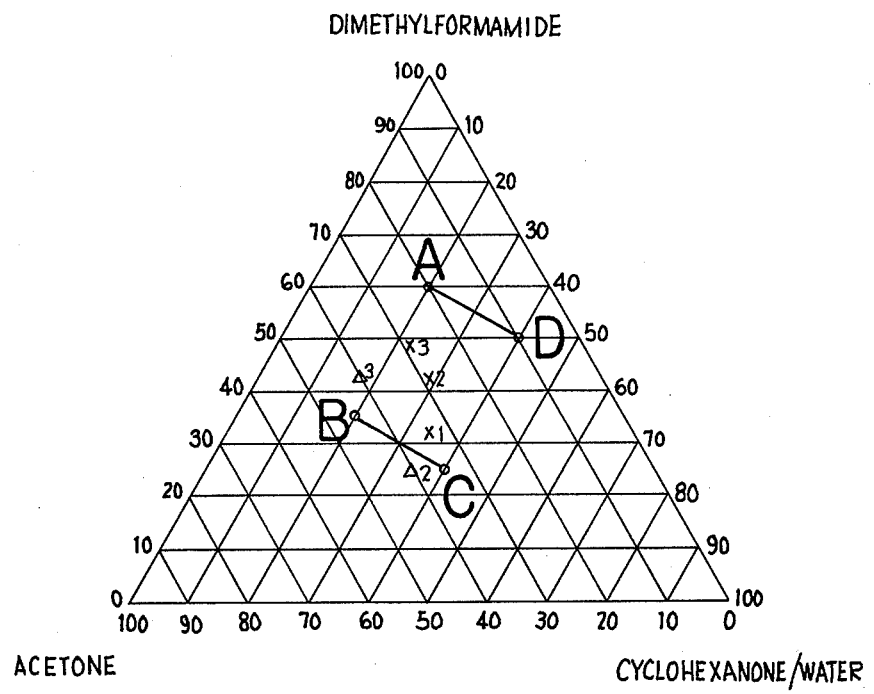

PROCESS FOR PREPARING SEMIPERMEABLE MEMBRANE HAVING SELECTIVE PERMEABILITY

BACKGROUND OF THE INVENTION

1. Field of the Invention

This invention relates to a process for preparing a ultrafiltration membrane suitable for the use in an artificial kidney belonging to the filtration type which has the selective permeability.

2. Description of Prior Arts

Most of the artificial kidneys conventionally employed belong to the so-called dialysis type artificial kidney that involves making the blood flow through a passage enclosed with a dialytic membrane and at the same time making a dialytic solution consisting mainly of a physiological saline solution flow along the reverse side surface of the dialytic membrane countercurrently to the blood, thereby removing low molecular waste products from the blood. The present method for removing the dissolved products by dialysis is suitable for removing urea or the like having a low molecular weight, but it is not satisfactorily effective for removing medium molecular weight products having molecular weights in a range of from 500 to 2,000, in which the toxic materials, recently being given attention as materials causing uremia, are included.

Removal of the medium molecular weight products can be effected by employing a membrane with an increased dialytic area or increasing the flow rate of the dialytic solution or the blood. However, these measures cause changes of composition or osmotic pressure of the intracellular fluid, intercellular fluid, cerebrospinal fluid, or the like, resulting in the occurrence of symptoms such as headache, vomiting, languorous feeling in the whole body, because the human body does not consist of a single compartment.

In contrast to the dialysis type, the artificial kidney belonging to the filtration type does not employ the dialytic solution, and it employs a system that involves; ultrafiltration of the blood to remove waste products having medium or lower molecular weights; addition of a substituting liquid (supplemental liquid) prepared by adding the constituents necessary for the human body to the blood containing concentrated amounts of blood corpuscles and proteinous materials produced by the ultrafiltration so as to dilute the concentrated blood until the normal concentration is reached; and returning the so adjusted blood to the body of the patient.

The ultrafiltration membrane to be used for the artificial kidney of the filtration type is required to prevent, as much as possible, the proteins in the blood from passing through the membrane and to give high permeant rate. Until now, there is not known a ultrafiltration membrane having such excellent characteristics. Since cellulose acetate has a stiff molecular skeleton with branching chains consisting of bendable substituents, it can be dissolved in a variety of solvents and is capable of precipitating as a filmy gel from a solution in a volatile solvent. It is knon that a thin membrane prepared by the above method is excellent as a dialysis membrane. This method can be also applied to the preparation of a thin membrane satisfactorily serving as the ultrafiltration membrane, if appropriate conditions for the preparation of membrane are selected.

The process for preparing a ultrafiltration membrane that employs cellulose acetate as the membrane material can be carried out by adding a swelling agent or a plasticizer to a solution of cellulose acetate in a volatile solvent and spreading the resulting solution. The nature of the selected swelling agent or plasticizer affect the conditions of gelation of the cellulose acetate. Accordingly, the pore diameter of the membrane greatly depends upon the so selected swelling agent or plasticizer. It is known that glycerol triacetate (as disclosed in Japanese Patent Publication No. 45(1970)-4,633) and a lower alcohol and its ester and a cyclic hydrocarbon and its ester (as disclosed in Japanese Patent Publication No. 48(1973)-40,050) can be employed as the swelling agent or the plasticizer used for this purpose. However, these additives are apt to remain in the membrane still after completion of the membrane preparation. Therefore, these are sometimes not appropriate for the preparation of the membrane for medical uses; and otherwise the formed membrane containing these additives does not satisfactorily show the characteristics of the ultrafiltration membrane.

SUMMARY OF THE INVENTION

After earnest studies, the inventors have found that a cellulose acetate membrane having satisfactory characteristics can be made when a mixture of dimethylformamide and acetone is employed as the solvent, a mixture of cyclohexanone and water in a certain ratio is employed as the swelling agent, and the ratio by weight between these mixtures is set in a certain range.

BRIEF EXPLANATION OF THE FIGURE

The FIGURE is a triangular plot, the coordinates of which are the amount of dimethylformamide, the amount of acetone, and the amount of the mixture of cyclohexanone and water, consisting in a three constituent system and being presented in % by weight, that is employed in the preparation of a spreading solution according to a process of the present invention. In the triangular coordinates, the marks identified by X1, X2 and X3 within the area enclosed with the line connecting the points, A, B, C and D show the mixing ratios adopted in Examples 1, 2 and 3, respectively, and the marks identified by Δ2 and Δ3 show the mixing ratios adopted in Comparative Examples 2 and 3, respectively.

In the present invention, the ratio by weight of the amount of dimethylformamide and that of acetone to that of the swelling agent necessarily is within the area defined by four points consisting of A (60, 20, 20), B (35, 45, 20), C (25, 35, 40) and D (50, 10, 40) in the triangular coordinates represented by FIGURE; and the ratio of the cyclohexanone to the water necessarily is in a range of from 0.8 to 1.3.

Cellulose acetate employed as a material of the ultrafiltration membrane in the invention advantageously has the acetylation degree in a range of 52-56%. The process for preparing the membrane is based on the spreading process, and the procedures are stated as follows:

(1) a spreading solution is prepared by dissolving cellulose acetate in a mixture solvent consisting of a cellulose acetate solvent and a swelling agent;

(2) the spreading solution is spread over a glass plate or a porous support having a flat surface, and the solvent is, in part, evaporated by allowing the spread solution to stand for a certain period;

(3) the membrane so formed and still under formation process (a part of the solvent still remains) is immersed in a non-solvent (in most cases, it is water) to undergo the gelation and to remove the solvent remaining in the membrane;

(4) the so formed membrane is heated, if necessary;

(5) it is then immersed in an aqueous solution containing a hygroscopic substance such as a polyvalent alcohol, and it is stored in that form or after being dried.

According to a preferable embodiment of the invention, the solvent mixture is prepared by first mixing acetone with dimethylformamide, second adding cyclohexanone to the mixture, and further adding water to the resultant.

The present invention will be further illustrated by the following examples, which are not intended to restrict the invention.

EXAMPLE 1

In a mixture solvent consisting of 27 g. of N,N'-dimethylformamide, 30 g. of acetone, 15 g. of cyclohexanone and 15 g. of water was dissolved under stirring 13.0 g. of cellulose acetate of the acetylation degree 54.6 and the polymerization degree of about 170. The solution so obtained was permitted to stand for 40 hours for the deforming purpose, after the dissolution was complete. The so prepared solution was spread over a Tetoron cloth scoured (available from Toray Co., Ltd., Taffeta #230) at a rate of 5 cm/sec. under the conditions of R.H. 65% and a temperature of 20° C., by means of a doctor blade having the slit width of 250$\mu$. The membrane still under formation process was immersed in water kept at a temperature of 1° C., under the conditions in which the spreading rate and the immersing rate were synchronized with each other to keep the period of duration of a part of the membrane in air at the level of 30 sec. The membrane that was changed into the form of a gel was kept for 3 hours in the water, and heat-treated for 15 minutes in warm water kept at 45° C.

The thus obtained membrane carried on the supporting cloth was provided to a circulation-type ultrafiltration apparatus (membrane area: 25 cm$^2$, thickness of the liquid passages: 200$\mu$). An aqueous solution containing 2,000 ppm of ovalbumin (molecular weight: 45,000), 200 ppm of vitamin B$_{12}$ (molecular weight: 1,355) and 1,000 ppm of urea (molecular weight: 60) was filtered in the apparatus under the conditions of 0.5 kg./cm$^2$ (pressure) and 130 ml./min. (circulating liquid volume rate). The filtrate was analyzed by means of liquid chromatography to determine the ratio of permeated substance for each of the substances. The ratios were 0.14% for ovalbumin, 92.0% for vitamin B$_{12}$, and 95.0% for urea. The total volume passed through the membrane was 1.22 (m$^3$/m$^2$, day) at 30 minutes from the beginning.

The same membrane was provided to a circulating counterpermeation apparatus for determining flat membrane, that has the same structure as shown in S. Souriragan, Inc. Eng. Chem. Fundam, 3, 206 (1964), and an aqueous solution containing 2,000 ppm of C.I. Direct Green 33 (Sirius Supra Green BB, molecular weight: 1,094, available from Farbenfabriken Bayer A.G.) was passed through the membrane under the conditions of 25° C., 25 kg./cm$^2$ (pressure) and 50 l./min. (circulating liquid volume rate). The filtrate was measured at 680 m$\mu$, and the dye concentration was determined based on the measured absorbance. The total volume passed through the membrane was 4.04 (m$^3$/m$^2$, day) at 30 minutes from the beginning, and the ratio of the permeated substance (permeability) was 0.66%. When either of ovalbumin or Sirius Supra Green is intended to pass through the membrane, a membrane preferably has the permeation volume at a higher level and the permeability at a lower level. However, 0.5 m$^3$/m$^2$, day and 3 m$^3$/m$^2$, day of the permeation volumes are sufficient for the aqueous ovalbumin solution and the aqueous Sirium Supra Green solution, respectively.

EXAMPLE 2

In a mixture solvent consisting of 37.0 g. of N,N'-dimethylformamide, 25.0 g. of acetone, 12.5 g. of cyclohexanone and 12.5 g. of water was dissolved 13.0 g. of cellulose acetate (the same one as employed in Example 1), and the solution was spread over a glass plate in place of the Tetoron cloth. A membrane with no supporting cloth was prepared under the same conditions as stated in Example 1. The so prepared membrane was then laid over a Tetoron cloth (the same one as employed in Example 1), and the determination was carried out in the same manner as stated in Example 1. The results are set out in Table 1.

EXAMPLE 3

The procedure for the membrane preparation stated in Example 2 was repeated except that 42.0 g. of N,N'-dimethylformamide, 25.0 g. of acetone, 10.0 g. of cyclohexanone and 10.0 g. of water were employed, and the determination was carried out in the same manner. The results are set out in Table 1.

COMPARATIVE EXAMPLE 1

A semipermeable membrane sold on the market for the use in an artificial kidney of the filtration type was determined in the same manner as stated in Example 2.

COMPARATIVE EXAMPLES 2–5

The procedure for the membrane preparation was repeated using the same cellulose acetate as employed in Examples 1 and 2, except that the composition of the solvent was changed, and the determination was carried out in the same manner. The spreading conditions were as follows:

[COMPARATIVE EXAMPLE 2]

22 g. of dimethylformamide, 35 g. of acetone, 1.5 g. of cyclohexanone, and 15 g. of water were employed, and the spreading was done on a Tetoron cloth

[COMPARATIVE EXAMPLE 3]

37 g. of dimethylformamide, 35 g. of acetone, 7.5 g. of cyclohexanone, and 7.5 g. of water were employed, and the spreading was done on a Tetoron cloth.

[COMPARATIVE EXAMPLE 4]

37 g of dimethylformamide, 25 g. of acetone, 7 g. of cyclohexanone, and 8 g. of water were employed, and the spreading was done on a glass plate.

[COMPARATIVE EXAMPLE 5]

42 g. of dimethylformamide, 25 g. of acetone, 6.8 g. of cyclohexanone, and 13.2 g. of water were employed, and the spreading was done on a glass plate.

COMPARATIVE EXAMPLES 6 AND 7

The procedure for the membrane preparation was repeated using the same cellulose acetate as employed in Examples 1 and 2, except that the swelling agent and the composition of the solvent were changed, and the determination was carried out in the same manner.

[COMPARATIVE EXAMPLE 6]

42 g. of dimethylformamide, 25 g. of acetone, 10 g. of t-butanol, and 10 g. of water were employed, and the spreading was done on a glass plate.

[COMPARATIVE EXAMPLE 7]

42 g. of dimethylformamide, 25 g. of acetone, 10 g. of acetic acid, and 10 g. of water were employed, and the spreading was done on a glass plate.

The results obtained in the above comparative examples are set out in Table 1, as well as the results obtained in the aforementioned examples.

TABLE 1

|  | Sirius Supra Green BB (25 kg./cm$^2$) | | Ovalbumin (0.5 kg./cm$^2$) | |
| --- | --- | --- | --- | --- |
|  | Permeation Volume (m$^3$/m$^3$,day) | Permeability % | Permeation Volume (m$^3$/m$^3$,day) | Permeability % |
| Example 1 | 4.04 | 0.66 | 1.22 | 0.14 |
| Example 2 | 4.1 | 0.23 | 0.50 | 0.12 |
| Example 3 | 3.8 | 0.36 | 0.64 | 0.20 |
| Comp. Ex. 1 | 3.7 | 0.43 | 0.88 | 0.11 |
| Comp. Ex. 2 | 0.65 | 4.20 | 0.10 | 3.04 |
| Comp. Ex. 3 | 0.06 | — | 0.02 | — |
| Comp. Ex. 4 | 0.05 | — | 0.01 | — |
| Comp. Ex. 5 | 0.05 | — | 0.01 | — |
| Comp. Ex. 6 | 0.48 | 3.5 | 0.15 | 3.2 |
| Comp. Ex. 7 | 3.2 | 1.7 | 0.81 | 2.1 |

What is claimed is:

1. In a process for preparing a semipermeable membrane suitable for use in an artificial kidney of the filtration type for purifying blood, which comprises the steps of casting a film of a solution of cellulose acetate dissolved in a solvent which solution also contains a swelling agent, then partially evaporating the solvent from the film, and then immersing the film in a non-solvent to gel the film and to remove the solvent from the film, whereby to form a semipermeable membrane, the improvement which comprises:

said cellulose acetate has an acetylation degree of from 52 to 56%, said solvent consists essentially of a mixture of dimethylformamide and acetone, said swelling agent consists essentially of a mixture of cyclohexanone and water in which the weight ratio of cyclohexanone to water is from 0.8 to 1.3, and wherein the weight ratio of dimethylformamide/acetone/swelling agent in said solution lies within the area bounded by points A, B, C and D in the attached drawing, wherein the coordinates of points A, B, C and D, expressed in terms of weight ratio of dimethylformamide/acetone/swelling agent, are as follows:

point A, 60/20/20
point B, 35/45/20
point C, 25/35/40
point D, 50/10/40.

2. A process as claimed in claim 1 in which said solution is prepared by first mixing acetone with dimethylformamide, second adding cyclohexanone to the mixture, then adding water to the mixture and then dissolving said cellulose acetate in the mixture.

* * * * *